July 2, 1963 — E. B. NOLT — 3,095,802
HAY BALER
Filed March 6, 1961 — 2 Sheets-Sheet 2
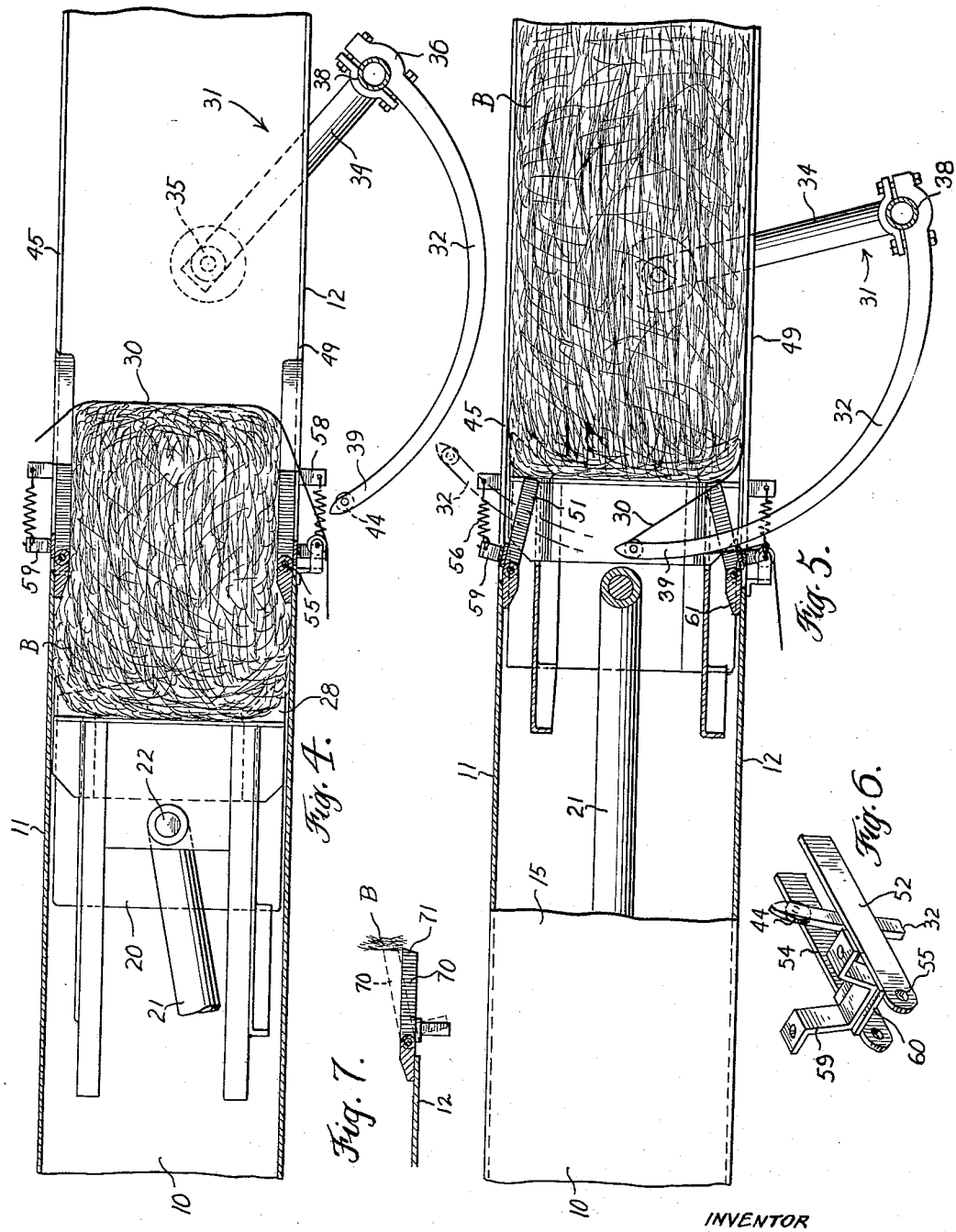
INVENTOR
EDWIN B. NOLT
BY Joseph A. Brown
ATTORNEY

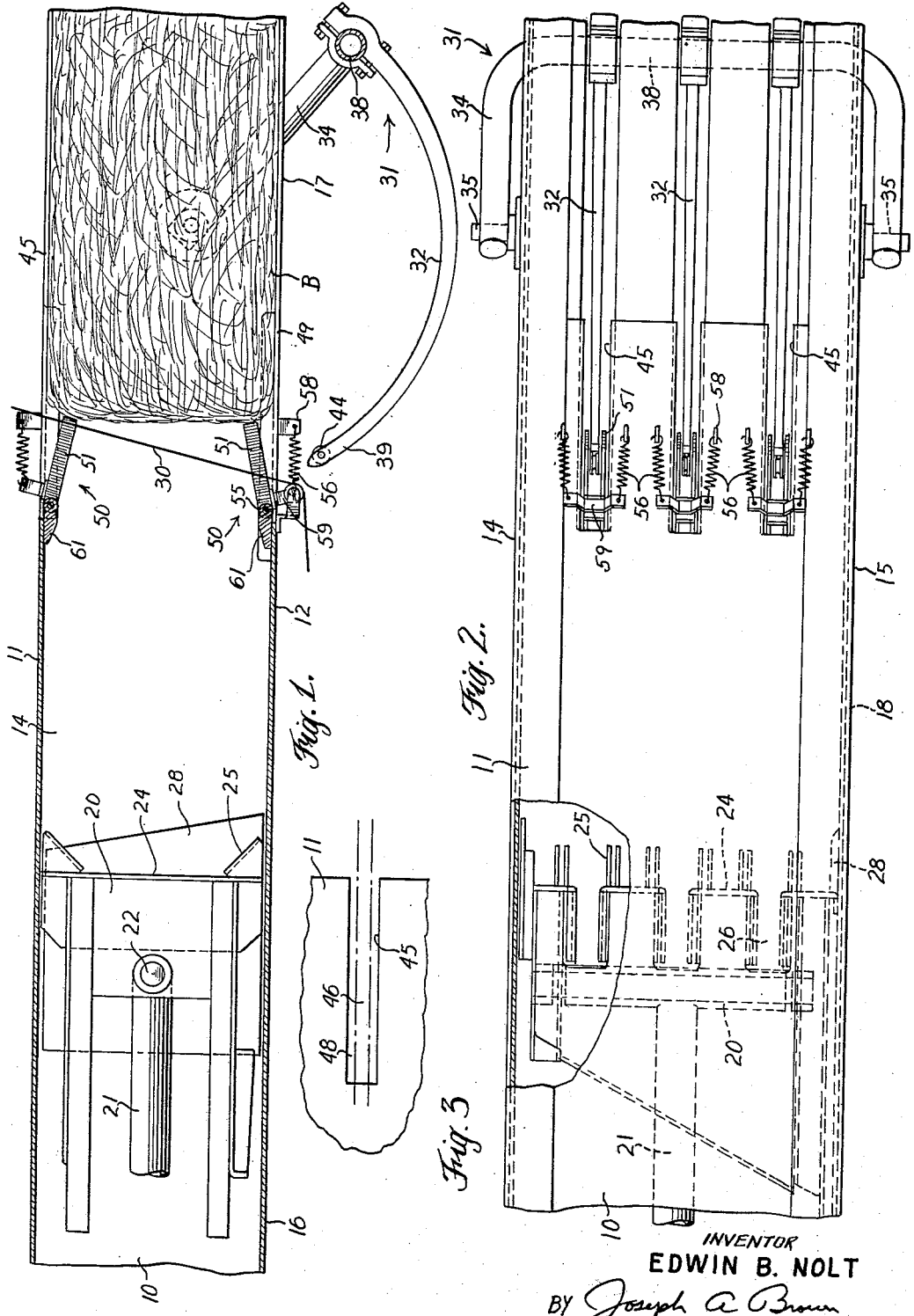

United States Patent Office 3,095,802
Patented July 2, 1963

3,095,802
HAY BALER
Edwin B. Nolt, New Holland, Pa., assignor to Sperry Rand Corporation, New Holland, Pa., a corporation of Delaware
Filed Mar. 6, 1961, Ser. No. 93,541
4 Claims. (Cl. 100—19)

This invention relates generally to hay balers and more particularly to improved hay dog means for the bale case of a baler.

In a hay baler, it is conventional to provide hay dogs for holding hay delivered rearwardly by a bale forming plunger from expanding forwardly when the plunger retracts. The dogs are helpful when a bale is being formed. However, they are particularly important when the bale is completed and the needle means of the baler has to be projected across the bale case. In retarding forward expansion of the hay, the dogs help to keep clear the paths in which the needles of the tying mechanism have to travel. The hay dogs are projectable through slots of the bale case of the baler, being spring loaded so that they move outwardly relative to the bale case when engaged by hay delivered by the baler plunger and move inwardly after the plunger has pushed the hay past the dogs.

Baler hay dogs are usually located laterally spaced from and slightly rearwardly of the bale case slots through which the tier needles pass. Each dog operates in its own bale case slot. Frequently, there is one hay dog for each tier needle; and since a given dog is located at one side of its associated needle, it provides protection for the needle only from that side. The other side of the needle may be subjected to interference caused by expansion of the compressed hay. Additional dogs may be provided to give greater needle protection. However, such solution is undesirable, not only because of the added costs involved in providing the dogs, but the costs involved in making additional slots in the bale case in which the dogs may operate. Further, such additional slots reduce the strength of the bale case and make the case less secure to escape of the hay being baled.

The main object of this invention is to provide in a hay baler improved hay dog means which operates more effectively than hay dog means of prior design.

Another object of this invention is to provide a hay dog arrangement which will provide better protection for each tier needle than available heretofore.

Another object of this invention is to provide a hay dog construction which is less expensive than prior designs.

A further object of this invention is to provide a hay dog arrangement in which the number of openings required in the bale case is reduced from that used heretofore, thereby rendering the bale case stronger and eliminating hole forming manufacturing operations.

A still further object of this invention is to provide a single hay dog for each tier needle of the baler, such dog having two hay retarding elements operative respectively on oposite sides of its associated needle.

Other objects of this invention will be apparent hereinafter from the specification and from the recital in the appended claims.

In the drawings:

FIG. 1 is a fragmentary longitudinal vertical section through the bale case of a baler and showing hay dog means constructed according to one embodiment of this invention, the needle means and the plunger of the baler being shown in retracted positions;

FIG. 2 is a plan view of FIG. 1, part of the top of the bale case being broken away to show the plunger construction;

FIG. 3 is a fragmentary plan view of the top of the baler and showing one of the bale case slots in which the hay dogs and needle means are operable;

FIG. 4 is a view similar to FIG. 1 but showing the baler plunger delivering hay rearwardly and thereby pivoting the hay dog means outwardly of the bale case;

FIG. 5 is a view similar to FIG. 4 showing the baler plunger in an extended position, the hay dog means in operative holding position, and the needle means partially projected across the bale case in solid lines and fully projected in dotted lines;

FIG. 6 is a perspective view of one of the hay dogs and a portion of the needle associated therewith projecting through the dog; and FIG. 7 is a side elevation showing hay dog means constructed according to another embodiment of this invention.

Referring now to the drawings by numerals of reference, and first to the embodiment of the invention showing FIGS. 1–6, 10 denotes an elongate bale case which is rectangular in cross section having a top wall 11, bottom wall 12 and side walls 14 and 15. Conventionally, bale case 10 extends fore-and-aft relative to the direction of travel of the baler and has a forward end 16 and a rear end 17. Between the two ends of the bale case, side wall 15 is provided with an opening 18 (FIG. 2) through which material may be fed into the bale case.

Reciprocable in bale case 10 is a plunger 20 which is movable from the position shown in FIG. 1, adjacent the forward end 16 of the bale case, to the position shown in FIG. 5, adjacent rear end 17, and then return. The plunger is reciprocated by means of a connecting rod 21 pivotally connected to the plunger at 22. The connecting rod is reciprocated from a suitable power source, not shown. The face 24 of the plunger is provided with forwardly projecting tabs 25 and the plunger face has recesses or slots 26 shown best in FIG. 2. The side of the plunger adjacent side wall 15 is provided with a knife 28 which is operable to sever crop material delivered into the bale case from material remaining outside of wall 15.

Plunger 20 conveys crop material in bale case 10 in a rearward direction. A plurality of wads go into making a completed bale. As each bale is formed, it is moved rearwardly against a tying medium 30, such as wire or twine, which extends across the bale case from the top wall 11 to the bottom wall 12. The movement of the bale against the tying medium causes the tying medium to be extended around the rearward end and the top and bottom of the formed bale. To pass the tying medium around the forward end of a completed bale, needle means 31 is provided comprising needles 32 which are adapted to be projected across the bale case 10. The number of needles employed corresponds to the number of strands which are to be banded around each bale. In the illustration of FIG. 2, three needles are shown. However, it will be understood that two needles could be used or some other number. Each needle is carried on a yoke 34 which straddles the sides 14 and 15 of the bale case and is pivotally connected thereto at 35. The rearward ends 36 of the needles are connected to the bight portion 38 of the yoke 34. Each needle has a free end 39 provided with a roller 44 engageable with the tying medium 30 to project it across the bale case as shown best in FIG. 5.

The top wall 11 is provided with three fore-and-aft extending laterally spaced openings or slots 45, each of which has a central portion 46 and lateral portions 48 on either side of the central portion, FIG. 3. The bottom wall 12 has openings 49 which are the same as and register with the openings 45 in top wall 11. When needles 32 are projected from the position shown in FIG. 4 to the position shown in solid lines in FIG. 5, the needles pass through the slots 49, then across the bale case 10 and out through the slots 45 in the top wall 11. The needles 32 all pass through spaces 26 in the face of the plunger 20. When projected, the needles are forwardly of the bale B in the bale case, as shown.

To prevent the separate wads of material from expanding forwardly each time the plunger retracts, hay dog means 50 constructed according to this invention is provided. Such means is mounted on bale case 10 and comprises six hay dogs 51, there being one hay dog for each of the openings 45 and one dog for each of the openings 49. All of the hay dogs are similarly constructed. Therefore, only one of the dogs will be described. Each dog comprises a pair of elongate hay engageable elements or arms 52 and 54, FIG. 6, which are spaced relative to each other and are pivotally connected at 55 to the bale case. When in normal position, each hay dog extends rearwardly and into the bale case as shown in FIG. 1. Each dog is held in such position by a pair of springs 56 connected between fixed tabs 58 on the bale case and brackets 59 welded to the hay dogs.

As shown in FIG. 1, the hay dogs at the bottom 12 of the bale case are biased to pivot in a counterclockwise direction while the dogs at the top of the bale case are biased to pivot in a clockwise direction. Each hay dog is provided with a transverse portion 60 which extends between the hay engageable elements 52 and 54 and is engageable with an associated fixed pivot support member 61 affixed to the bale case. When the dogs are pivoted inwardly, the bracket portions 60 engage the fixed support member 61 thereby limiting the inward pivoting of the dogs. Thus, members 61 comprise stops as well as supports.

When the hay dogs are in normal position projecting into the bale case 10, they form acute angles with the sides 11 and 12 of the bale case. When a charge of hay is delivered rearwardly by the bale forming plunger 20, the dogs are engaged by the hay and pivoted outwardly as shown in FIG. 4. Once the plunger has pushed the hay past the hay dogs, the dogs are free to be pivoted by springs 56 back into the bale case and through the slots 26 in the face of the plunger. The dogs then assume a position as shown in FIG. 1 and behind the hay until the next wad of material is delivered.

When a bale is completed, needle means 31 is operative to project the tying medium 30 around the forward end of the completed bale. As shown in FIG. 5, each needle 32 is projected through the slots 26 in the plunger and through the space between the hay engageable elements 52 and 54 of the dogs. When projected, the needles 32 pass through the central portions 46 of the bale case openings. The hay engageable elements 52 and 54 of the dogs operate in the lateral portions 48 of these openings. Since the needles pass between the hay engageable elements 52 and 54 of the rearwardly projecting dogs, they are protected from both sides from the expansion of the bale B. The needles 32 are thus better protected than was heretofore provided.

Since the hay dogs 50 operate in the same slots through which the needles project, the number of openings in top wall 11 and bottom wall 12 of bale case 10 are kept at a minimum thereby maintaining the overall strength of the bale case to a maximum. The number of operations in manufacturing the bale case are reduced thus saving costs. Since each dog has two hay engageable elements instead of one, and since these elements are close to and on opposite sides of its associated needle, the hold on hay delivered rearwardly by the plunger 20 as a bale is formed and when it is completed it is extremely effective.

In FIG. 7, a hay dog 70 is illustrated constructed according to another embodiment of this invention. The working free end 71 of each of the hay engageable elements of the dog is cut at an angle relative to the longitudinal extension of the element. Thus, when the dog is in normal position projected into the bale case, the face 71 extends perpendicular to the sides of the bale case and firmly engages the forward side of the hay delivered rearwardly. In like respect, when the dogs have been pivoted outwardly, as shown in solid lines, the face 71 forms an acute angle with the bale case side adjacent thereto and expanding hay moving forwardly on engaging the angular face 71 exerts an inward pivoting force on the dog thereby assisting the spring means 56 in returning the dog to proper position.

While this invention has been described in connection with two embodiments thereof, it will be understood that it is capable of further modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A hay baler comprising a fore-and-aft extending bale case having a pair of side walls, a forward end and a rear end, each of said side walls having an opening therein, the opening in one wall being aligned with the opening in the other wall, said opening in said one side wall having a central portion and portions on opposite sides of the central portion, a plunger reciprocal in said bale case and having a hay engageable face operable to convey crop material deposited in the bale case from said forward end and toward said rear end, said plunger face having a slot therein registering with said wall openings when said plunger is in its rearmost position, said plunger moving hay past said openings on each stroke thereof toward said rear end, needle means operable in timed relation with said plunger and projectable across said bale case through said plunger slot and through said openings, a hay dog having a normal position wherein it extends into said bale case and in the path of said plunger and having a width less than the width of said slot, means supporting said hay dog on said one side wall for pivotal movement about an axis transverse to the reciprocations of said plunger, spring means connected between said hay dog and the bale case and biasing the dog to said normal position while permitting it to yieldably pivot outwardly relative to the bale case responsive to engagement by hay moved toward said bale case rear end by said plunger, said hay dog having a pair of fore-and-aft extending laterally spaced hay engageable elements which form an acute angle with said one side wall when the hay dog is in normal position, said hay engageable elements being located in register with portions of said one side wall opening on the opposite sides of the central portion thereof and in register with the slot in the face of the plunger and having forward ends connected to said supporting means and free rearward ends, and said needle means passing between said pair of elements and through said central portions of said openings when projected across said bale case so that the free ends of the hay engageable elements move into the slot and against the end of the hay when the plunger is in its rearmost position whereby the hay dog opposes engagement of the hay with the needle upon forward movement of said plunger.

2. A hay baler comprising a fore-and-aft extending bale case having a pair of side walls, a forward end and a rear end, each of said side walls having an opening therein, the opening in one wall being aligned with the opening in the other wall, said opening in said one side wall having a central portion and portions on opposite sides of the central portion, a plunger reciprocable in said bale case and operable to convey crop material deposited in the bale case from said forward end and towards said rear end, said plunger moving material past said openings on each stroke thereof toward said rear end, needle means operable in timed relation with said plunger and projectable across said bale case through said openings, a hay dog having a normal position wherein it extends into said bale case and in the path of said plunger, means supporting said hay dog on said one side wall for pivotal movement about an axis transverse to the reciprocations of said plunger, spring means connected between said hay dog and the bale case and biasing the dog to said normal position while permitting it to yieldably pivot outwardly relative to the bale case responsive to engagement by material moved toward said bale case rear end by said plunger, said hay dog having a pair of fore-and-aft extending laterally spaced hay engageable elements which form an acute angle with said one side wall when the hay dog is in normal position, said hay engageable elements being located in register with the portions of said one side wall opening on opposite sides of the central portion thereof and having forward ends connected to said supporting means and free rearward ends, a member rigidly interconnecting said engageable elements adjacent the forward ends thereof, said member being engageable with said bale case to limit pivoting of the hay dog into the bale case, and said needle means passing between said pair of elements through said central portions of said openings when projected across said bale case.

3. A hay baler as recited in claim 2 wherein each of said pair of elements of said hay dog has a rearward free end which extends perpendicular to said one side wall when the hay dog is in normal position and forms an acute angle with said one side wall when the hay dog is pivoted outwardly from said normal position.

4. A hay baler as recited in claim 2 wherein the opening in the other bale case side wall has a hay dog similar to the hay dog on said one side wall, and said needle means extends through both dogs when projected.

References Cited in the file of this patent

UNITED STATES PATENTS

| | | |
|---|---|---|
| 558,754 | Anderson | Apr. 21, 1896 |
| 763,905 | Kauffman | June 28, 1904 |
| 899,309 | Lee et al. | Sept. 22, 1908 |
| 962,273 | Tuttle | June 21, 1910 |
| 1,297,450 | Davis | Mar. 18, 1919 |
| 2,595,503 | Altgelt | May 6, 1952 |
| 2,655,861 | Lizenbee | Oct. 20, 1953 |